United States Patent [19]
Hausauer

[11] Patent Number: 6,138,192
[45] Date of Patent: Oct. 24, 2000

[54] DELIVERING A REQUEST TO WRITE OR READ DATA BEFORE DELIVERING AN EARLIER WRITE REQUEST

[75] Inventor: Brian S. Hausauer, Spring, Tex.

[73] Assignee: Compaq Computer Corporation, Houston, Tex.

[21] Appl. No.: 08/777,575

[22] Filed: Dec. 31, 1996

[51] Int. Cl.$^7$ .................................................. G06F 13/00
[52] U.S. Cl. ........................ 710/100; 710/103; 710/128; 710/129
[58] Field of Search .................................. 395/280, 841, 395/306, 281, 308, 309, 325, 292; 364/468

[56] References Cited

U.S. PATENT DOCUMENTS

| | | |
|---|---|---|
| 5,381,528 | 1/1995 | Brunelle . |
| 5,396,602 | 3/1995 | Amini et al. . |
| 5,438,509 | 8/1995 | Heffron .................................. 364/408 |
| 5,448,702 | 9/1995 | Garcia, Jr. et al. ...................... 395/325 |
| 5,454,093 | 9/1995 | Abdulhafiz et al. . |
| 5,455,915 | 10/1995 | Coke . |
| 5,463,753 | 10/1995 | Fry et al. . |
| 5,471,590 | 11/1995 | Melo et al. . |
| 5,491,811 | 2/1996 | Arimilli et al. . |
| 5,524,235 | 6/1996 | Larson et al. . |
| 5,528,766 | 6/1996 | Ziegler et al. . |
| 5,530,933 | 6/1996 | Frink et al. . |
| 5,535,340 | 7/1996 | Bell et al. . |
| 5,535,341 | 7/1996 | Shah et al. . |
| 5,535,395 | 7/1996 | Tipley et al. . |
| 5,546,546 | 8/1996 | Bell et al. ............................... 395/292 |

(List continued on next page.)

FOREIGN PATENT DOCUMENTS

| | | |
|---|---|---|
| 334627 A2 | 9/1989 | European Pat. Off. . |
| 0 629 956 A2 | 12/1994 | European Pat. Off. . |
| 55-069830 | 5/1980 | Japan . |
| 94/08296 | 4/1994 | WIPO . |

OTHER PUBLICATIONS

European Search Report, Oct. 12, 1997.
W. Andrews, Bridge Solutions Struggle to Keep Pace with Developing Buses, *Computer Design*, vol. 32, No. 2, pp. 71(8), Feb. 1993.
G. H. Anthes, Legent Users Like Workstation Move, *Computerworld*, vol. 26, No. 37, pp. 79(2), Sep. 14, 1992.
Digital Semiconductor 21152 PCI–to–PCI Bridge Data Sheet, *Digital Equipment Corporation*, 1996.
J. Gallant, Bridge Chips Help Connect Host and Expansion Buses to the PCI Bus, *EDN Elect. Design News*, vol. 40, No. 3, pp. 77–80, 82, Feb. 2, 1995.
IBM27–82351 PCI to PCI Bridge Databook, *IBM*, Revision 1.1, Dec. 1994.
IBM27–82352 PCI–to–PCI Bridge Data Book, *IBM*, Revision 1.0, Dec. 1995.
R. Richardson, VROOMM, *Vulcan's Computer Buyers's Guide*, pp. 106(2), Apr. 1990.
T. Shanley et al., PCI System Architecture, 3rd. ed., *Addison–Wesley*, 1995.
M. Slater, Intel Reveals Successor to 960KA, *Microprocesor Report*, vol. 8, No. 8, pp. 13(4), Jun. 20, 1994.
K. Wang et al., Designing the MPC105 PCI Bridge/Memory Controller, IEEE Micro, vol. 15, No. 2, pp. 44–49, Apr. 1995.
PCI Local Bus Specification, Rev. 2.1, Jun. 1995, PCI Special Interest Group, Portland, OR.
PCI–to–PCI Bridge Architecture Specification, Rev. 1.0, Apr. 1994, PCI Special Interest Group, Portland, OR.

*Primary Examiner*—Ayaz R. Sheirh
*Assistant Examiner*—Eric S. Thang
*Attorney, Agent, or Firm*—Sharp, Comfort & Merrett, P.C.

[57] ABSTRACT

A bridge device for delivering data transactions between devices on two data buses in a computer system includes, for each pair of devices that may transact across the bridge device, a dedicated storage area that aids in completing transactions between the devices in the pair. The bridge device also includes a controller that allows transactions in one dedicated storage area to be completed without regard to the completion of earlier-issued transactions in another dedicated storage area.

14 Claims, 5 Drawing Sheets

U.S. PATENT DOCUMENTS

| | | |
|---|---|---|
| 5,548,730 | 8/1996 | Young et al. . |
| 5,555,383 | 9/1996 | Elazar et al. ............................ 395/306 |
| 5,557,754 | 9/1996 | Sone et al. . |
| 5,559,800 | 9/1996 | Mousseau et al. . |
| 5,568,619 | 10/1996 | Blackledge et al. .................... 395/281 |
| 5,579,530 | 11/1996 | Solomon et al. . |
| 5,581,782 | 12/1996 | Sarangdhar et al. . |
| 5,586,297 | 12/1996 | Bryg et al. . |
| 5,594,878 | 1/1997 | Shibata et al. . |
| 5,594,882 | 1/1997 | Bell . |
| 5,596,729 | 1/1997 | Lester et al. . |
| 5,613,075 | 3/1997 | Wade et al. . |
| 5,619,661 | 4/1997 | Crews et al. . |
| 5,619,723 | 4/1997 | Jones et al. . |
| 5,623,633 | 4/1997 | Zeller et al. . |
| 5,623,700 | 4/1997 | Parks et al. . |
| 5,625,779 | 4/1997 | Solomon et al. . |
| 5,627,993 | 5/1997 | Abato et al. . |
| 5,630,094 | 5/1997 | Hayek et al. . |
| 5,632,021 | 5/1997 | Jennings et al. ........................ 395/309 |
| 5,634,138 | 5/1997 | Ananthan et al. ...................... 395/841 |
| 5,644,729 | 7/1997 | Amini et al. . |
| 5,649,175 | 7/1997 | Kanekal et al. . |
| 5,659,696 | 8/1997 | Amini et al. . |
| 5,664,117 | 9/1997 | Shah et al. . |
| 5,664,124 | 9/1997 | Katz et al. . |
| 5,664,150 | 9/1997 | Isaac et al. . |
| 5,673,399 | 9/1997 | Guthrie et al. ......................... 395/308 |
| 5,687,347 | 11/1997 | Omura et al. . |
| 5,694,556 | 12/1997 | Neal et al. ............................. 395/308 |
| 5,710,906 | 1/1998 | Ghosh et al. . |
| 5,717,876 | 2/1998 | Robertson . |

DELIVERING A REQUEST TO WRITE OR READ DATA BEFORE DELIVERING AN EARLIER WRITE REQUEST

BACKGROUND

The invention relates to delivering transactions between data buses in a computer system.

Computer systems often include one or more data buses that allow components of the computer system to communicate. For example, one common type of data bus is a Peripheral Component Interface (PCI) bus, which provides a special communication protocol between the computer system's CPU/main memory and peripheral components, such as small computer system interface (SCSI) devices and network interface cards (NICs). When system memory and the peripheral components (e.g., PCI devices) reside on different buses, a bridge is required to manage the flow of data transactions between the two buses. Typically, system memory and PCI devices each reside, at least indirectly, on PCI buses connected by a PCI-to-PCI bridge. PCI bus architecture is defined by the PCI Local Bus Specification, Revision 2.1 ("PCI Spec 2.1"), published in June 1995, by the PCI Special Interest Group, Portland, Ore., incorporated by reference. PCI-to-PCI bridge architecture is defined by the PCI-to-PCI Bridge Architecture Specification, Revision 1.0 ("PCI Bridge Spec 1.0"), published in April 1994, by the PCI Special Interest Group, also incorporated by reference.

Under the PCI Spec 2.1 and PCI Bridge Spec 1.0 standards, PCI bridges support two types of transactions: posted transactions (including all memory write cycles), which are completed on the initiating bus before they complete on the target bus, and delayed transactions (including memory read requests and I/O and configuration read/write requests), which are completed on the target bus before they are completed on the initiating bus. According to the PCI Spec 2.1, PCI-to-PCI bridges must strongly favor posted write transactions when determining the order in which transactions are to be performed on the target bus. The PCI Spec 2.1 requires that, in order to prevent lock-up conditions, the computer system must allow posted write cycles to bypass earlier-initiated delayed request cycles and must prevent delayed request cycles from bypassing earlier-initiated posted write cycles. This requirement holds even when a posted write transaction and a delayed request transaction occur between two different pairs of devices.

Figure 1:
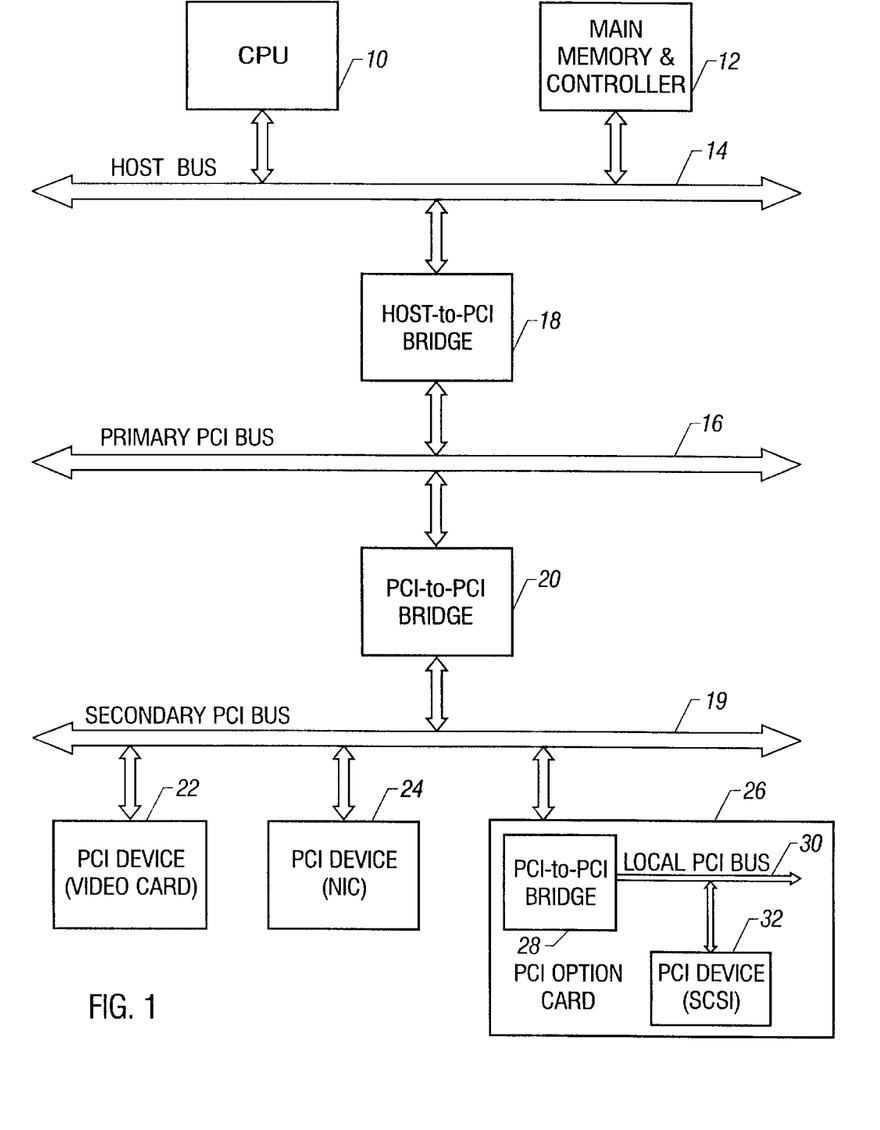
FIG. 1 is a block diagram of a computer system.

Referring to FIG. 1, a typical computer system includes a central processing unit (CPU) 10 and a main memory device 12 (including a memory controller) connected to a host bus 14. The host bus 14 communicates with a PCI bus 16 through a host-to-PCI bridge device 18. PCI bus 16 in turn communicates with another PCI bus 19 through a PCI-to-PCI bridge 20. PCI bus 16 is known as the "primary" PCI bus, and PCI bus 19 is known as the "secondary" PCI bus, because PCI bus 16 is closer hierarchically to the host bus 14 than is PCI bus 19.

Several peripheral devices, including video card 22, NIC 24, and PCI option card 26, are connected to the secondary PCI bus 19. Each device plugs in to a "slot" on the secondary PCI bus 19. The PCI option card 26 includes a PCI-to-PCI bridge device 28 and a PCI bus 30 of its own, which allows additional PCI devices to plug into a single slot on the secondary PCI bus 19. One or more PCI devices, such as SCSI device 32, may reside on the PCI option card 26. The PCI option card 26 operates as a "multi-threaded" device (i.e., a device that can maintain multiple delayed transactions simultaneously) when more than one PCI device is connected to its local PCI bus 30.

Transactions initiated by the CPU and targeting a device on the secondary PCI bus 19 are known as "downstream" transactions, and transactions initiated by a device on the secondary bus 19 and targeting main memory 12 are known as "upstream" transactions. Transactions initiated by a device on the secondary bus 19 and targeting another device on the secondary bus 19 are known as "peer-to-peer" transactions. Peer-to-peer transactions are not dealt with here.

According to PCI Spec 2.1, any posted write transaction initiated on the primary or secondary PCI bus and posted in the PCI-to-PCI bridge device 20 must be completed on the target bus before any subsequently-issued transaction can be completed on the target bus. In addition, any transaction that completes on the initiating bus before a delayed read transaction is initiated on the bus must be completed on the target bus before the delayed read transaction is completed on the target bus. Likewise, any transaction that is completed on the initiating bus after a delayed read transaction completes on the initiating bus must complete after the delayed read transaction on the target bus. Therefore, a memory write transaction posted in the PCI-to-PCI bridge 20 by SCSI device 22 must be completed on the primary PCI bus 16 before a later-issued delayed read request from NIC 24 is completed, and the posted memory write transaction must invalidate prefetch data associated with any earlier-issued delayed read transactions from NIC 24 (i.e., the prefetch data must be flushed from the PCI-to-PCI bridge 20 when the memory write transaction is posted).

SUMMARY

In one aspect, the invention features a computer system having a first device on a first data bus, second and third devices on a second data bus, and a bridge device interposed between the first and second data buses and configured to complete transactions between the first device and the second device without regard to whether the transactions entered the bridge device before or after transactions between the first device and the third device.

Embodiments of the ivention may include one or more of the following features. The bridge device may preserve the chronological order of the transactions between the first device and the second device. The bridge device may attempt to accelerate completion of a delayed transaction between the first device and the second device when the delayed transaction is preventing completion of another transaction (e.g., a downstream read transaction from the CPU) between the first and second devices. The computer system may include a ghost base address register that aids in determining which of the devices on the second data bus is the target of a transaction initiated by the first device. The computer system also may include a grant signal that grants control of the second data bus to either the second or third device, and the bridge device may be configured to use the grant signal to determine whether the second or third device has initiated a transaction on the second data bus. One or both of the data buses may be a PCI bus.

In another aspect, the invention features a method for use in controlling the delivery of two transactions between a device on a first data bus and each of two other devices on a second data bus across a bridge device serving the data buses. The transactions first are stored in the bridge device, and then one of the transactions is delivered without regard to the chronological order in which the transactions were stored in the bridge device. The other transaction then may be delivered.

Embodiments of the invention may include one or more of the following features. The chronological order of transactions to be delivered between the device on the first data bus and one of the other devices may be preserved. Delivery of a delayed transaction between the device on the first data bus and one of the other devices may be accelerated when the delayed transaction is preventing another transaction (e.g., a downstream read transaction from the CPU) from being delivered between the devices. One or both of the buses may be a PCI bus.

In another aspect, the invention features a computer system having a CPU on a primary PCI bus, two PCI devices on a secondary PCI bus, and a PCI-to-PCI bridge device interposed between the primary and secondary buses. The bridge device includes a storage area that stores two transactions, one of which is to be delivered between the CPU and each of the PCI devices, and an arbitration circuit that selects one of the transactions for delivery without regard to the chronological order in which the transactions were stored in the storage area.

Embodiments of the invention may include one or more of the following features. The arbitration circuit may be configured to select the other transaction after selecting the one transaction. The storage area may include two queue blocks, one of which stores transactions occurring between the CPU and one of the PCI devices, and the other of which stores transactions occurring between the CPU and the other PCI device. The storage area may include a first set of buffers having one buffer that stores data flowing from the CPU to a first one of the PCI devices and another buffer that stores data flowing from the first PCI device to the CPU. The storage area also may include a second set of buffers having one buffer that stores data flowing from the CPU to a second one of the PCI devices and another buffer that stores data flowing from the second PCI device to the CPU.

In another aspect, the invention features a bridge device for delivering data transactions between devices on two data buses in a computer system. For each pair of devices that may transact across the bridge device, the bridge device includes a dedicated storage area that aids in completing transactions between the devices in the pair. The bridge devivce also includes a controller that allows transactions in one dedicated storage area to be completed without regard to the completion of earlier-issued transactions in another dedicated storage area.

Embodiments of the invention may include one or more of the following features. Each dedicated storage area may include a portion dedicated to data flowing in a particular direction across the bridge device, and it also may include another portion dedicated to data flowing in the opposite direction across the bridge device. The dedicated storage area may include a dedicated buffer for each type of transaction that may cross the bridge. The transaction types may include posted writes, delayed requests, and delayed completions.

Among the advantages of the embodiments of the invention are the following. Transaction ordering rules may be relaxed so that transactions between two devices are ordered strictly only with respect to other transactions between the same two devices. For example, in a delayed transaction architecture, a delayed read transaction between a CPU and a first PCI device may be completed before an earlier-issued posted write transaction between the CPU and another PCI device. In addition, prefetch data associated with an earlier-issued delayed read transaction between the CPU and the first PCI device need not be invalidated when the write transaction between the CPU and the other PCI device is posted. Therefore, computer systems relying on PCI bridges may operate more efficiently since data delivered during delayed transactions is not discarded as frequently.

Other features and advantages will become apparent from the following description and from the claims.

DESCRIPTION

Figure 2:
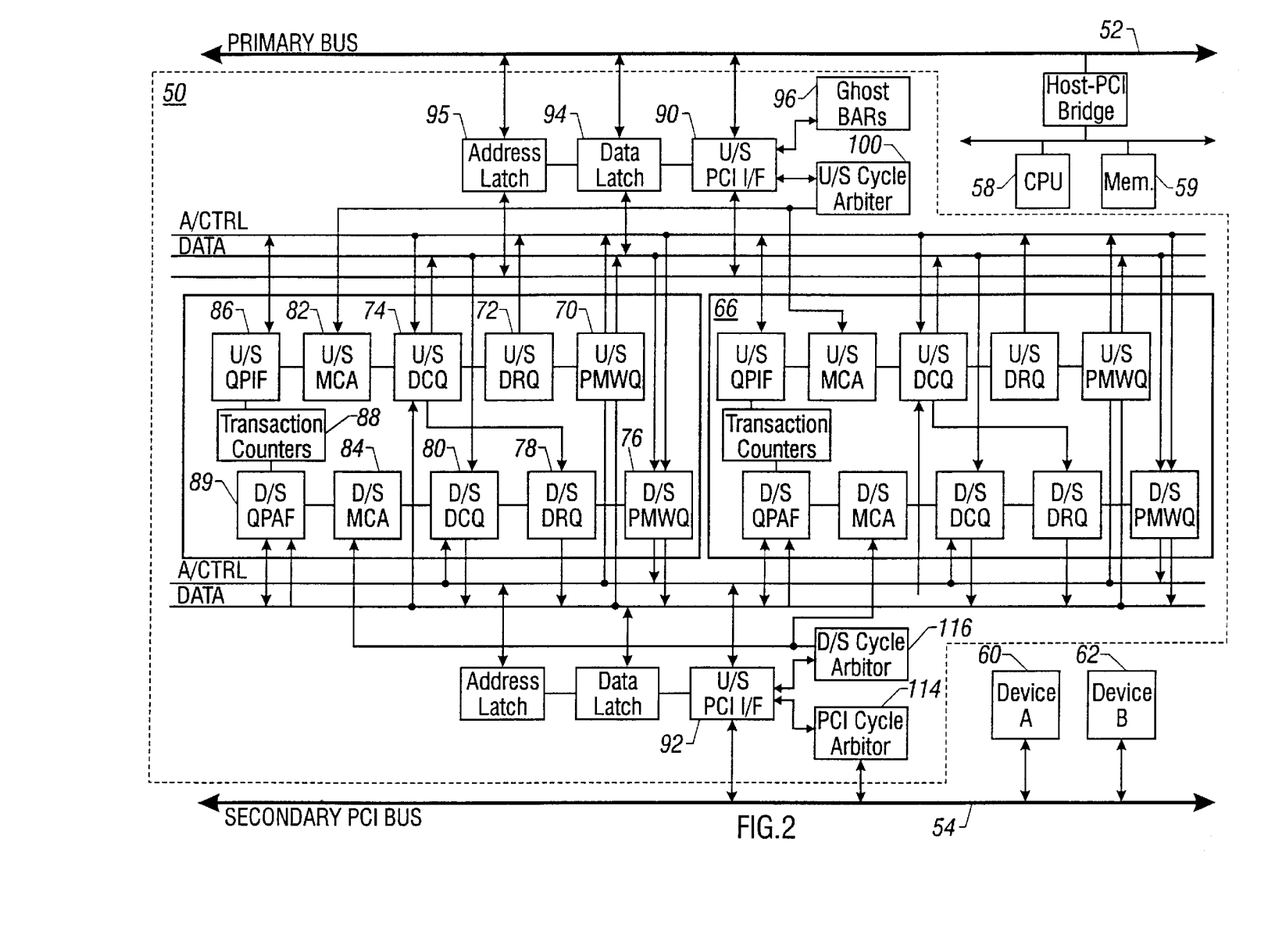
FIG. 2 is a block diagram of a computer system in which data buses are connected by a bridge that implements relaxed transaction ordering rules.

Referring to FIG. 2, a computer system 50 includes a PCI-to-PCI bridge device 50 (PPB or "bridge") connecting primary and secondary PCI buses 52 and 54, respectively, that follows relaxed transaction ordering rules. In particular, the bridge 50 operates such that transactions between CPU 58 and PCI device 60 ("Device A") are ordered only with respect to other transactions between these two devices, without regard to the chronological relationship between these transactions and transactions occurring between CPU 58 and PCI device 62 ("Device B").

The bridge 50 achieves relaxed transaction ordering by maintaining two identical sets of buffers 64 and 66, or "queue blocks," for each PCI device "pair" that may transact across the bridge 50. For example, queue block 64 temporarily stores transactions occurring between CPU 58 and Device A 60, while queue block 66 temporarily stores transactions occurring between CPU 58 and Device B 62. The bridge 50 will include an additional queue block for every other PCI device on the secondary PCI bus 54. The bridge device 50 treats CPU 58 and memory 59 as a single device on the primary PCI bus 52. The buffers in the queue blocks 64 and 66 need not be permanently assigned to the secondary PCI slots, but instead may be dynamically assigned, e.g., at system start-up.

Each queue block 64 and 66 manages transactions flowing between the primary PCI bus 52 and the devices 60 and 62 on the secondary PCI bus 54. The queue blocks 64 and 66 are similar, so only queue block 64 is described below. Queue block 66 (and any other queue blocks that may be in the bridge device 52) function similarly. Each queue block resembles the queue block shown and described in U.S. patent application Ser. No. 08/655,254, filed Jun. 5, 1996, by John MacLaren and Alan Goodrum and incorporated by reference in its entirety.

Each queue block 64 contains three upstream queues 70, 72, and 74, which store information flowing upstream (i.e., from the corresponding PCI device 60 on the secondary PCI bus 54 to the CPU 58), and three downstream queues 76, 78, and 80, which store information flowing downstream (i.e., from the CPU 58 to the corresponding PCI device 60). The queue block 64 also includes two cycle arbiters 82 and 84 and two queue block-to-PCI (QPIF) interfaces 86 and 89, which govern the flow of information out of either the upstream or downstream queues, as described below.

The first downstream queue, a posted memory write queue 76, stores posted memory write cycles issued by the CPU 58 on the primary bus 52 along with all information required to execute each cycle on the secondary bus 54. The PMWQ 76 has four transaction buffers, each of which holds one posted memory write transaction containing up to eight cache lines (256 bytes) of data. The upstream PMWQ 70 stores posted memory write cycles issued by PCI device 60 on the secondary bus 54 and functions similarly to the downstream PMWQ 76. The PMWQs 70 and 76 are described in more detail in U.S. patent application Ser. No. 08/655,254, filed Jun. 5, 1996.

The second downstream queue, a delayed request queue (DRQ) 78, stores delayed request transactions (i.e., delayed read requests (DRR), such as memory read (MR), memory read line (MRL), and memory read multiple (MRM) requests; and input/output (I/O) read/writes and configuration (config) read/writes) issued by the CPU 58 on the primary bus 52, along with all information required to execute each transaction on the secondary bus 54. The DRQ 78 has three transaction buffers, each of which is capable of holding one double-word, or "dword," of data for delayed writes. Likewise, the upstream DRQ 72 stores delayed request transactions issued by PCI device 60 on the secondary bus 64 and functions similarly to the downstream DRQ 78. The DRQs 72 and 78 are described in more detail in U.S. patent application Ser. No. 08/655,254, filed Jun. 5, 1996.

The third downstream queue, a delayed completion queue (DCQ) 80, stores delayed completion information provided by the CPU 58 in response to delayed request transactions generated by PCI device 60. For a delayed read request, the corresponding completion information contains the read data requested by the initiating device and the read status (i.e., an indication of whether a parity error or target abort occurred). The delayed completion information returned for a delayed write transaction is the same as that returned for a delayed read request, except that no data is returned for delayed writes.

The DCQ 80 has eight completion buffers, each of which can hold up to eight cache lines of completion information for a single delayed request. In addition to the completion information, each completion buffer also stores a copy of the delayed request that generated the information. This copy of the delayed request is used to determine when a subsequent request by the issuing PCI device is a retry of the stored request. If a subsequent request matches the stored request and the completion buffer contains the requested data, the DCQ 80 provides the completion data to the requesting device.

Similarly, the upstream DCQ 74 stores delayed completion information provided by PCI device 60 in response to delayed requests from the CPU 58. Because I/O and config read/writes occur only on the downstream bus, only the upstream DCQ 74 may contain delayed completion information corresponding to one of these transactions.

If one of the DCQs 74 or 80 determines that one of its buffers contains data intended for a requesting device but different than the data requested in the current transaction, the buffer may be flushed to prevent the requesting master from receiving stale data. The buffer is flushed when it contains prefetch data (i.e., data left in the buffer after the requesting device has retrieved some of the data, or data that was not specifically requested by the device), but is not flushed when it contains completion data (i.e., data specifically requested by a device that has not yet returned to retrieve it). If the buffer contains completion data and the requesting device has issued a request that does not "hit" the buffer, the DCQ 144 tags the device as a "multi-threaded" device (i.e., one that is capable of maintaining more than one transaction at once) and allocates another completion buffer for the new request.

Each buffer in the DCQs 74 and 80 progresses through several states as data passes through. The buffer is in an "empty" state when it contains no data, a "complete" state when it contains data specifically requested by the initiating device, and a "prefetch" state when it contains data that was not specifically requested but was prefetched by the bridge device 52 (e.g., after the initiating device retrieved all requested data from the buffer and kept its "frame__" signal asserted, indicating that it wanted more data). The DCQs 74 and 80 are described in more detail in U.S. patent application Ser. No. 08/655,254, filed Jun. 5, 1996.

Each master cycle arbiter (MCA) 82 and 84 in the queue block 64 maintains ordering constraints between posted memory write, delayed request, and delayed completion transactions in either the downstream queues or the upstream queues. The relaxed ordering constraints are similar to those set forth in the PCI Bridge Architecture Specification, Version 2.1, except that strict ordering is maintained only between transactions involving the same pair of devices (i.e., transactions between the CPU 58 and PCI device 60 are ordered only with respect to other transactions between those two devices). These ordering constraints require that bus cycles maintain strong write ordering and that deadlocks do not occur. Therefore, each MCA 82 or 84 determines the order in which posted memory write transactions in the corresponding PMWQ 70 or 76 and delayed request transactions in the corresponding DRQ 72 or 78 are run on the corresponding PCI bus 52 or 54. Each MCA 82 or 84 also controls the availability of delayed completion information stored in the corresponding DCQ 74 or 80. To ensure compliance with these rules, the downstream MCA 84 gives each posted memory write cycle an opportunity to bypass earlier-issued delayed request cycles, while both the downstream and the upstream MCAs 84 and 82, respectively, do not allow delayed request and delayed completion cycles to bypass earlier-issued posted memory write cycles.

Figure 3:
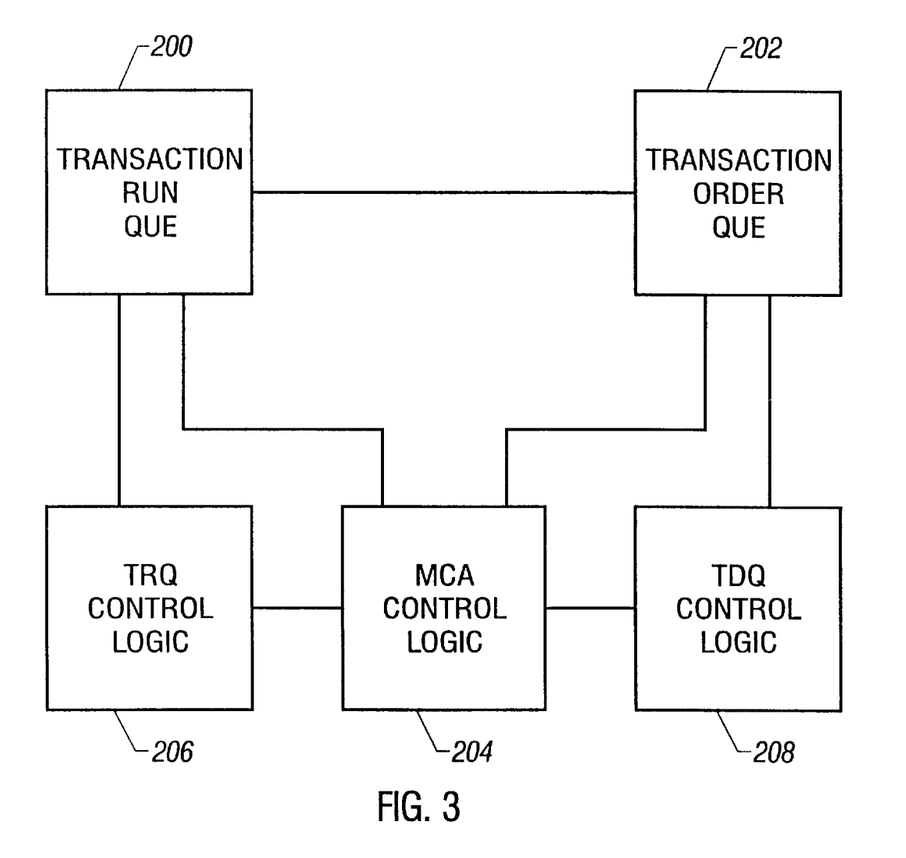
FIG. 3 is a block diagram of a master cycle arbiter that assures proper ordering of transactions.

Referring also to FIG. 3, each MCA 82 or 84 uses two transaction queues, a transaction run queue (TRQ) (or transaction execution queue) 200 and a transaction order queue (TOQ) 202, to manage cycles enqueued in the corresponding PMWQ, DRQ, and DCQ. An MCA control block 204 receives transactions from the PMWQ, DRQ, and DCQ and outputs run commands. The transactions are moved into and out of the TRQ 200 and TOQ 202 by a TRQ control block 206 and a TOQ control block 208, respectively.

The TRQ 200 is the queue from which the MCA determines the transaction execution order. Transactions in the TRQ 200 can be executed in any order without violating the transaction ordering rules, but once a posted memory write cycle is placed in the TRQ 200, no other cycle can be placed in the TRQ 200 until the posted memory write is removed. Transactions in the TRQ 200 are tried in circular order and generally are completed in the order in which they were received. However, if a transaction in the TRQ 200 is retried on the PCI bus, the MCA 82 or 84 may select the next transaction in the TRQ 200 to be tried on the PCI bus. Delayed completion transactions are never placed in the TRQ 200 because they are slave cycles rather than master cycles. Furthermore, because delayed completion information may be made available to the requesting device as soon as it enters the DCQ if no posted memory write cycles are pending in the PMWQ, delayed completion transactions are placed in the TOQ 202 only when a posted memory write cycle is pending in the TRQ 200.

The TRQ 200 is a circular queue that holds up to four transactions at once. Because the MCA always must be able to run at least one posted memory write transaction to preserve the required ordering constraints, the TRQ 200 never can hold more than three delayed request transactions at once. Furthermore, the TRQ can hold only one posted write transaction at a time because posted writes cannot be passed by any later-initiated transaction, including other posted writes.

The TOQ 202 is a first-in-first-out (FIFO) queue that retains the historical order of transactions received by the bridge after a posted memory write transaction is placed in the TRQ 200. Because all transactions must wait for earlier-issued posted memory writes to run, all transactions including posted memory write, delayed request, and delayed completion transactions, are placed in the TOQ 202 when a posted memory write is enqueued in the TRQ 200. Transactions in the TOQ 202 must remain in the TOQ 202 until the posted memory write transaction is removed from the TRQ 200. The TOQ 202 can hold up to three posted memory write transactions (the fourth will be stored in the TRQ 200), three delayed request transactions, and four delayed completion transactions. The MCAs 82 and 84, including TRQ 200, TOQ 202, and control blocks 204, 206, and 208 are described in more detail in U.S. patent application Ser. No. 08/655,254, filed Jun. 5, 1996.

An upstream queue-to-PCI interface (QPIF) 86 manages transactions flowing from the upstream queues 70, 72, and 74 to the primary PCI bus 52, and from the primary PCI bus 52 to the downstream DCQ 80. The QPIF 86 enters a "master" mode to run posted memory write and delayed request transactions from the PMWQ 70 and the DRQ 72 on the primary bus 52. The QPIF 86 enters a "slave" mode to provide data from the upstream DCQ 74 to the CPU 58 or to send transactions from the primary PCI bus 52 to the downstream DCQ 80.

When the QPIF 86 receives a posted write transaction from the bus 52 it forwards the transaction to the downstream PMWQ 76 if a corresponding one of a group of transaction counters 88 indicates that the downstream PMWQ 76 is not full. When the QPIF 86 receives a delayed request, it first forwards the request to the DCQ 74 to determine whether the transaction already has been placed in the upstream DCQ 74 and, if so, whether the corresponding delayed completion information has been returned by PCI device 60. If the delayed completion information is in the upstream DCQ 74, the information is provided to the CPU 58 and the transaction is terminated. If the request already is enqueued but the delayed completion information has not been returned, the CPU 58 is retried and the transaction is terminated on the primary PCI bus 52. If the transaction is not yet enqueued, the upstream DCQ 74 reserves a completion buffer for the transaction and the QPIF 86 forwards the transaction to the downstream DRQ 78, as long as the corresponding one of the transaction counters 88 indicates that the downstream DRQ 78 is not full. The downstream QPIF 89 functions similarly to the upstream QPIF 86. The QPIFs 86 and 89 are described in more detail in U.S. patent application Ser. No. 08/655,254, filed Jun. 5, 1996.

The transaction counters 88 maintain a count of the number of transactions enqueued in the upstream and downstream queues, respectively. A posted memory write (PMW) counter indicates the number of PMW transactions held in the corresponding posted memory write queue. The PMW counter is incremented each time a PMW transaction is sent to the corresponding PMWQ. The counter is decremented each time a PMW cycle has been completed on the corresponding PCI bus. Likewise, a delayed request (DR) counter counts the number of DR transactions held in the corresponding delayed request queue. A delayed completion (DC) counter counts the number of delayed completions that are enqueued in the corresponding master cycle arbiter. The transaction counters are described in more detail in U.S. patent application Ser. No. 08/655,254, filed Jun. 5, 1996.

The bridge device 52 includes upstream and downstream PCI interface devices 90 and 92, respectively. The upstream PCI interface 90 allows the bridge device 50 to communicate with the devices (i.e., the CPU 58 and main memory 59) on the primary bus 52, and the downstream PCI interface 92 allows the bridge device 50 to communicate with the devices (i.e., Device A 60 and Device B 62) on the secondary bus 54.

When the CPU takes control of the primary bus and initiates a transaction, the upstream PCI interface 90 becomes a PCI slave device. The interface 90 latches the PCI command, address, and data in data and address latches 94 and 95. The interface 90 then determines which of the downstream PCI devices 60 and 62 is the target of the transaction. To do so, the interface compares the memory address provided by the CPU 58 to the addresses in ghost base address registers (Ghost BARs) 96 in the bridge device 50. (The Ghost BARs 96 are created by snooping the base address registers (BARs) created by POST at start-up. Each pair of BARs maps a PCI slot to a block of memory, and the Ghost BARs contain copies of these mappings.) The PCI interface 90 assumes that the CPU 58 is the master of all downstream transactions.

Figure 4A:
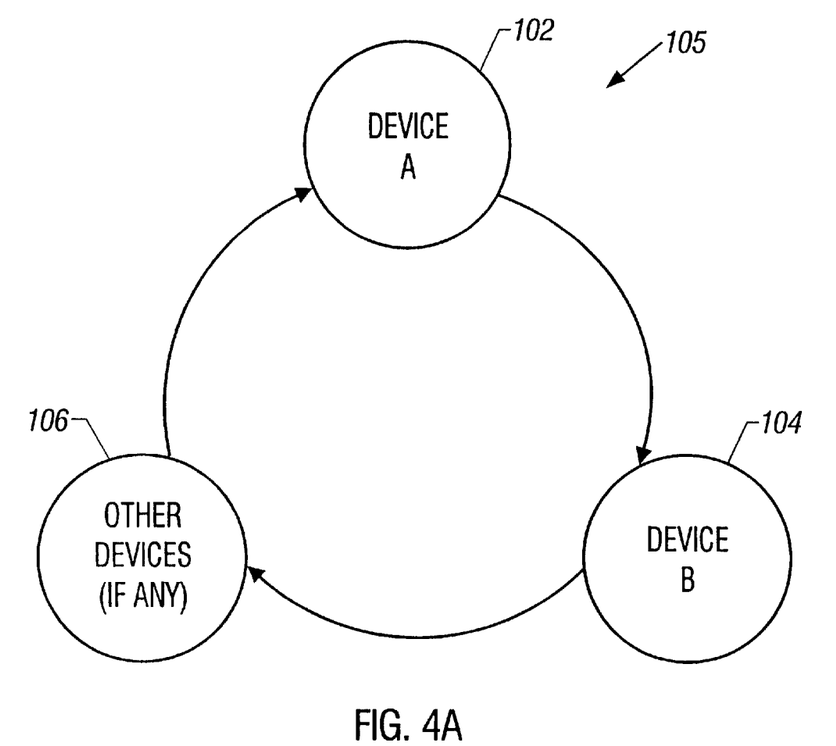
FIGS. 4A and 4B are state transition diagrams of an arbitration scheme.

Referring also to FIG. 4A, an upstream cycle arbiter 100 uses a "Level I" round robin scheme 105 to select the queue block 64 or 66 from which an upstream transaction should be run on the primary bus 52. The arbiter 100 first selects the queue block 64 corresponding to Device A 60 (state 102). The arbiter 100 then selects the queue 66 corresponding to Device B 62, and if any other PCI devices are connected to the secondary bus 54, the arbiter 100 progressively selects the queues corresponding to those devices. If one of the queue blocks 64 and 66 does not contain a transaction to run, the arbiter 100 skips the corresponding state in its round robin scheme 105. If the transaction from the selected queue block is retried, the arbiter 100 moves to the next state in the round robin scheme 105.

Figure 4B:
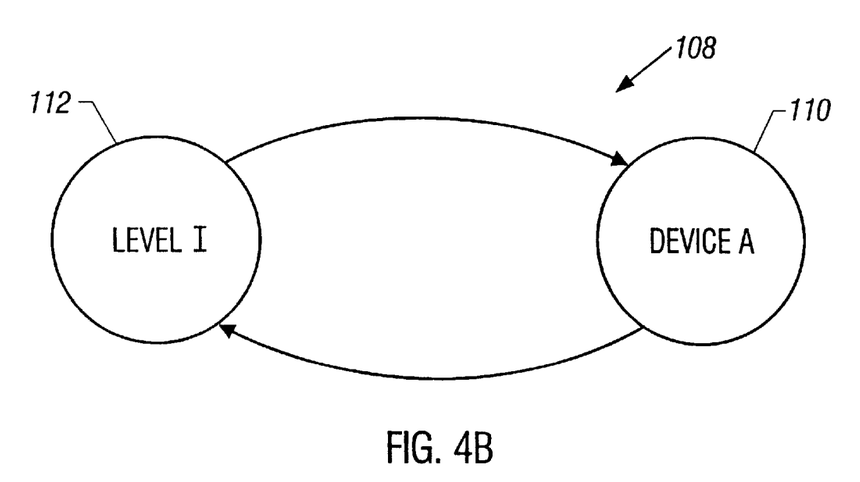

Referring to FIG. 4B, the PCI Spec 2.1 contains a "bridge interface priority" rule providing that when both the primary and secondary buses initiate a transaction simultaneously, the arbiter 100 must give priority to the downstream transaction. But in some bridges that allow write posting, this requirement may lead to a deadlock if a downstream device posts a write at the same time that the CPU issues a read request to the downstream device. In this situation, the bridge 50 would be instructed both to complete the posted write before completing any delayed requests for the same device and to complete the downstream read before completing any transactions issued simultaneously by a downstream master.

To prevent a deadlock from occurring, the upstream cycle arbiter in some embodiments may need to switch to a "Level II" arbitration scheme 108 if this condition occurs. In the Level II scheme 108, the arbiter 100 elevates the priority of the simultaneously-issued posted write transaction in an attempt to complete the transaction more quickly (state 110). After the upstream interface 90 tries to run the posted write transaction on the primary bus 52, the arbiter 100 returns to the "Level I" arbitration scheme 105 of FIG. 4A to select the next transaction to run. If the posted write transaction did not run successfully on the primary bus 52, the arbiter 100 returns to the Level II arbitration scheme 108 after selecting a transaction from the Level I scheme 105 (i.e., the arbiter 100 continues in the Level II scheme 108 until the posted write transaction successfully completes).

Referring again to FIG. 2, the downstream PCI interface 92 operates similarly to the upstream PCI interface 90, with a few exceptions. First, unlike the upstream cycle arbiter 100, the downstream cycle arbiter 116 never will need to use a two-level arbitration scheme, because the downstream PCI interface 92 is not subject to the "bridge interface priority" rule. Second, the downstream interface 92 always assumes that the CPU 58 is the target device and does not need to rely on the Ghost BARs 96 to determine which PCI device 60 or 62 is the master. Instead, the downstream interface 92 monitors the REQ and GNT lines in the PCI arbiter 114 to determine which of the devices 60 and 62 on the secondary PCI bus 54 is the master and therefore which queue block 64 or 66 should receive the transaction.

Figure 5:
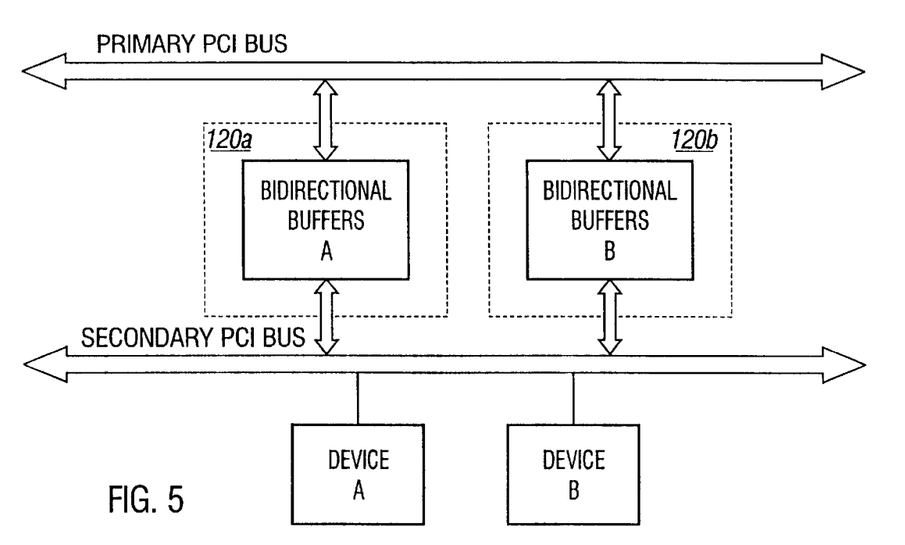
FIG. 5 is a block diagram of an alternative bridge architecture.

Other embodiments are within the scope of the following claims. For example, referring to FIG. 5, the PCI-to-PCI bridge device may include a set of bidirectional transaction queues 120*a*, 120*b* for each PCI device pair instead of two sets of unidirectional queues per pair. The invention also may be implemented in non-PCI architectures and in PCI-architectures that do not follow PCI Spec. 2.1 or PCI Bridge Spec. 1.0.

What is claimed is:

1. A computer system comprising:
    two data buses, one of which is configured to receive from at least one data processing device, requests to write data to or read data from at least one other data processing device via one of the data buses;
    an arbitration device configured to issue said grant signal to a data processing device seeking to place said request on one of the data buses;
    a bridge device interposed between the data buses and configured to implement an ordering scheme that enables the bridge device to;
    receive a write request and then a subsequent request, in that order, from the one data bus, and
    deliver the subsequent request and then the write request, in that order, to the other data bus;
    wherein the bridge device is configured to use the grant signal to determine which data device has placed a request on the data bus.

2. The computer system of claim 1 wherein the ordering scheme enables the bridge device to deliver the subsequent request before delivering the write request only if the one data bus receives both requests from one data processing device.

3. The computer system of claim 1 wherein the ordering scheme enables the bridge device to attempt to accelerate delivery of the write request when the write request is preventing delivery of the subsequent request.

4. The computer system of claim 3 wherein the subsequent request comprises a downstream read request from a CPU.

5. The computer system of claim 1 further comprising a ghost base address register that includes information indicating which data processing device on the other data bus is to be read from or written to.

6. The computer system of claim 1 wherein one of the data buses comprises a PCI bus.

7. The computer system of claim 1 wherein each of the data buses comprises a PCI bus.

8. A computer system comprising:
    a CPU and a memory device having access to a primary PCI bus,
    two PCI devices having access to a secondary PCI bus;
    and a PCI-to-PCI bridge device interposed between the primary and secondary buses, the PCI-to-PCI bridge device comprising:
        a storage area that receives from at least one of the PCI devices via the secondary PCI bus, a request to write data to the memory device and a subsequent request to write data to or read data from the memory device, in that order, and
        an arbitration circuit that selects the subsequent request and then the write request for delivery, in that order, to the memory device via the primary PCI bus;
    wherein the storage area comprises two queue blocks one of which stores requests to be delivered between the CPU and one of the PCI devices, and the other of which stores requests to be delivered between the CPU and the other one of the PCI devices.

9. A computer system comprising:
    a CPU and a memory device having access to a primary PCI bus,
    two PCI devices having access to a secondary PCI bus;
    and a PCI-to-PCI bridge device interposed between the primary and secondary buses and comprising:
        a storage area that receives, from at least one of the PCI devices via the secondary PCI bus, a request to write data to the memory device and a subsequent request to write data to or read data from the memory device, in that order, and
        an arbitration circuit that selects the subsequent request and then the write request for delivery, in that order, to the memory device via the primary PCI bus;
    wherein the storage area comprises:
        a first set of buffers having one buffer that stores data flowing from the CPU to a first one of the PCI devices and another buffer that stores data flowing from the first PCI device to the CPU, and
        a second set of buffers having one buffer that stores data flowing from the CPU to a second one of the PCI devices and another buffer that stores data flowing from the second PCI device to the CPU.

10. A bridge device for use in delivering, from at least one data processing device having access to one data bus, requests to write data to or read data from at least one data processing device bus having access to another data bus, the bridge device comprising:
    for each pair of data processing devices that may transact via the bridge device, a dedicated storage area that receives a request via the one data bus for delivery via the other data bus, and
    a controller configured so that, when a write request is received by one of the dedicated storage areas via one data bus and then a subsequent request is received by another of the dedicated storage areas via the same data bus, in that order, the bridge device may deliver the subsequent request via the other data bus before delivering the write request.

11. The bridge device of claim 10 wherein each dedicated storage area comprises a portion dedicated to data flowing in a particular direction across the bridge device.

12. The bridge device of claim 11 wherein each dedicated storage area comprises another portion dedicated to data flowing in the opposite direction across the bridge device.

13. The bridge device of claim 10 wherein the dedicated storage area comprises a dedicated buffer for each type of request that may be received by the bridge.

14. The bridge device of claim 13 wherein the request types include posted writes, delayed requests, and delayed completions.

* * * * *